(12) United States Patent
Takeda et al.

(10) Patent No.: US 8,695,321 B2
(45) Date of Patent: Apr. 15, 2014

(54) GAS TURBINE CONTROL APPARATUS AND CONTROL METHOD FOR GENERATING AN ELECTRIC MOTOR TORQUE INSTRUCTION BASED ON THE DETECTED EXHAUST GAS TEMPERATURE

(75) Inventors: Kazuhiro Takeda, Hiroshima (JP);
Masahiro Kobayashi, Hiroshima (JP);
Hideki Nagao, Hiroshima (JP);
Yoshiyuki Okamoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1022 days.

(21) Appl. No.: 12/671,308

(22) PCT Filed: May 16, 2008

(86) PCT No.: PCT/JP2008/059080
§ 371 (c)(1),
(2), (4) Date: Apr. 15, 2010

(87) PCT Pub. No.: WO2009/084250
PCT Pub. Date: Jul. 9, 2009

(65) Prior Publication Data
US 2010/0319356 A1    Dec. 23, 2010

(30) Foreign Application Priority Data
Dec. 27, 2007  (JP) .................................. 2007-337194

(51) Int. Cl.
*F02C 9/00* (2006.01)
*F02G 3/00* (2006.01)

(52) U.S. Cl.
USPC ...... 60/39.24; 60/39.282; 60/269; 60/39.281; 60/773; 290/52

(58) Field of Classification Search
USPC .................. 60/793, 39.24, 39.282, 269, 773, 60/39.281; 290/52
See application file for complete search history.

(56) References Cited

U.S. PATENT DOCUMENTS 3,958,414 A * 5/1976 Smith .......................... 60/39.281
3,991,569 A * 11/1976 Smith .......................... 60/39.281
(Continued)

FOREIGN PATENT DOCUMENTS

JP      3563143       8/1996
JP      2007-512456   5/2007

OTHER PUBLICATIONS

Qatari Notification for Payment of Publication and Grant Fees issued Sep. 18, 2012 in corresponding Qatari Application No. GCC/P/2008/12182 with English translation.

(Continued)

Primary Examiner — William H Rodriguez
(74) Attorney, Agent, or Firm — Wenderoth, Lind & Ponack, L.L.P.

(57) ABSTRACT

A control apparatus for controlling a compressor driven by a driving unit generating driving power by a gas turbine and an electric motor includes: a temperature detection section for detecting an exhaust gas temperature of the gas turbine; and a control section for generating a motor torque instruction value for the electric motor based on the detected exhaust gas temperature. Such a control apparatus can realize a control so as not to distribute a load on the electric motor when the exhaust gas temperature of the gas turbine is low and a driving power is low. As a result, the operation efficiency can be enhanced.

22 Claims, 12 Drawing Sheets

(56) References Cited

U.S. PATENT DOCUMENTS

| | | | |
|---|---|---|---|
| 5,391,925 A | | 2/1995 | Casten et al. |
| 5,689,141 A | | 11/1997 | Kikkawa et al. |
| 6,351,090 B1 | * | 2/2002 | Boyer et al. .................. 318/139 |
| 2006/0283206 A1 | | 12/2006 | Rasmussen et al. |
| 2009/0194044 A1 | * | 8/2009 | Nishida ..................... 123/41.02 |
| 2011/0138816 A1 | * | 6/2011 | Takeda et al. .................. 60/772 |
| 2012/0079822 A1 | * | 4/2012 | Yacoub .......................... 60/597 |
| 2012/0090301 A1 | * | 4/2012 | Sujan et al. ..................... 60/277 |

OTHER PUBLICATIONS

Indonesian Notice of Granting issued Sep. 28, 2012 in corresponding Indonesian Application No. W-00201000498 with English translation.

International Search Report issued Jun. 17, 2008 in International (PCT) Application No. PCT/JP2008/059080.

* cited by examiner

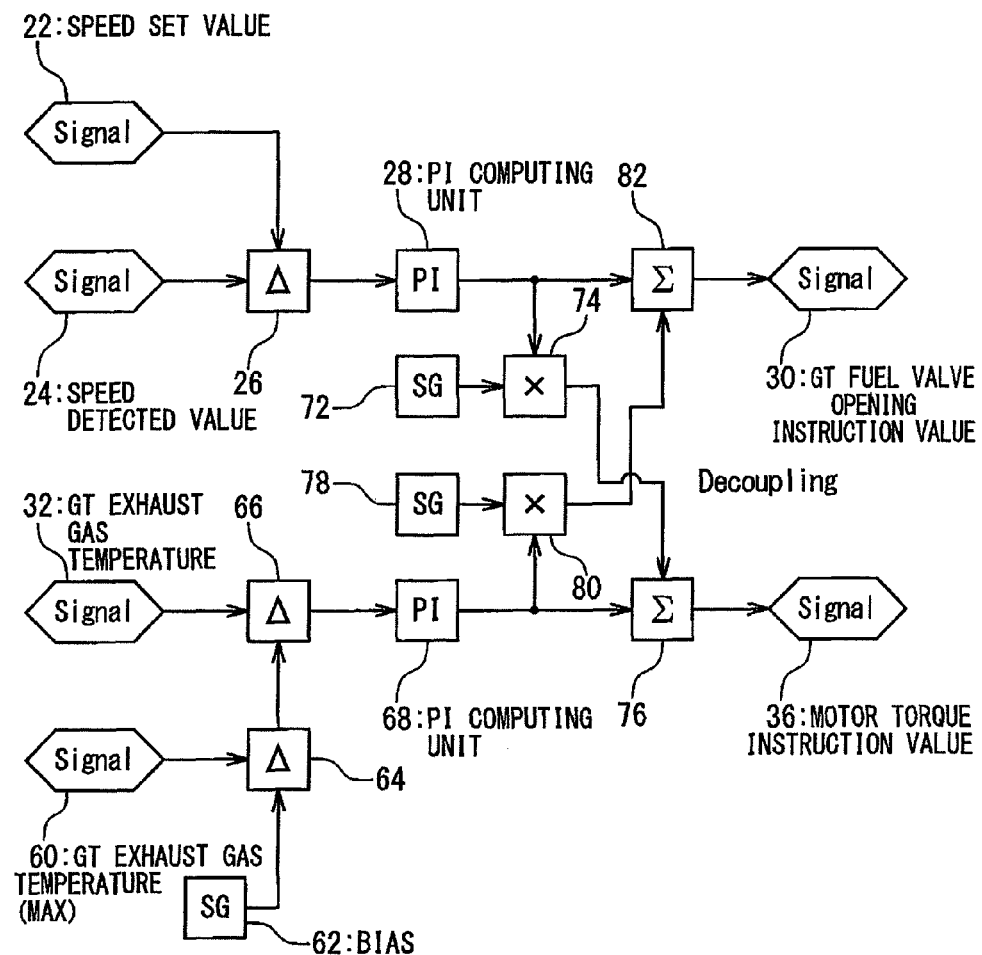

GAS TURBINE CONTROL APPARATUS AND CONTROL METHOD FOR GENERATING AN ELECTRIC MOTOR TORQUE INSTRUCTION BASED ON THE DETECTED EXHAUST GAS TEMPERATURE

TECHNICAL FIELD

The present invention relates to control of a compressor driven by a gas turbine and an electric motor. This Patent Application is based on Japanese Patent Application No. 2007-337194 filed at Dec. 27, 2007. The disclosure of the Japanese Patent Application is incorporated herein by reference.

BACKGROUND ART

There is known a plant having a compressor driven by driving power generated by a gas turbine. In a natural gas liquefaction plant, for example, a gas turbine driven by combusting natural gas drives a compressor that compresses a refrigerant of a cooling cycle for liquefying natural gas.

A gas flow of a compressor driven by a gas turbine is controlled according to the increase or decrease of the rotating speed. When the rotating speed increases and the air volume increases, the load (power) of the compressor increases. When the rotating speed decreases and the gas flow decreases, the load (power) of the compressor decreases.

When the load of driving mechanism is relatively insufficient to the load of the compressor, the load is compensated by additionally using an electric motor as well as a gas turbine. The following document discloses an example of such a technique.

Document 1: Japanese Patent No. 3563143

With this technique, an electric motor acting as an alternate-current (AC) generator as an auxiliary generator generating a starting torque is provided in each of a plurality of gas turbines. Under an operating condition of a high driving power generated from each gas turbine as compared with a driving power required in a compressor, the electric motor converts an excessive driving power of the gas turbine into electric power.

DISCLOSURE OF INVENTION

As a reference example for explaining problems to be solved in the present invention, an example of control over a compressor will be described. FIGS. 1 and 2 are diagrams for explaining the control according to the reference example.

The control over the compressor can be realized by simultaneously operating the load of the gas turbine and the load of the electric motor in response to a control signal for controlling the rotating speed of the compressor. FIG. 1 is a control block diagram of a control apparatus in a plant. A speed set value 122 is inputted to the control apparatus. Furthermore, a speed detected value 124 that is a detected value of the rotation speed of the shaft of the compressor is inputted to the control apparatus. A subtractor 126 calculates a deviation between the speed detected value 124 and the speed set value 122. A PI computing unit 128 executes a PI calculation based on the deviation and outputs a total instruction value. An opening instruction value 130 for a fuel valve of the gas turbine and a torque instruction value 132 for an electric motor 6 are calculated based on the total instruction value.

FIG. 2 shows an example of a method of determining the fuel valve opening 130 and the torque instruction value 132 based on the instruction value outputted from the PI computing unit 128. The horizontal axis indicates the load of the compressor. The vertical axis indicates the load of the driving mechanism including the gas turbine and the electric motor. When the load of the compressor 5 changes, the ratio of the load L (GT) of the gas turbine to the load L (M) of the electric motor is controlled to be kept constant. By such a control, the gas turbine and the electric motor can be controlled in accordance with the load of the compressor.

Meanwhile, an operation efficiency of a gas turbine is generally defined by the Heat Rate that is the ratio of the driving power to the inflow heat quantity (a fuel flow). When the gas turbine is operated to raise the exhaust gas temperature (Tex) at the constant rotating speed (namely, operated to raise the driving power), then the Heat Rate is reduced so that efficient operation with low fuel consumption can be realized.

When the driving mechanism is controlled by the method shown in. FIG. 2, a load is distributed to the electric motor even at low loading. The load distributed to the gas turbine decreases by as much as a load distributed to the electric motor. The gas turbine has higher operation efficiency at higher load. Therefore, if the load of the gas turbine decreases, the operation efficiency falls.

A control technique capable of improving the operation efficiency of a compressor driven by a gas turbine and an electric motor is desired.

According to an aspect of the present invention, a control apparatus for controlling a compressor driven by a driving unit generating drive power by a gas turbine and an electric motor is provided. The control apparatus includes: a temperature detection section for detecting an exhaust gas temperature of the gas turbine; and a control section for generating a motor torque instruction value for the electric motor based on the detected exhaust gas temperature.

Such a control apparatus can realize a control so as not to distribute a load on the electric motor when the exhaust gas temperature of the gas turbine is low and a driving power is low. As a result, the operation efficiency can be enhanced.

According to another aspect of the present invention, a control method for controlling a compressor driven by a driving unit generating a drive power by a gas turbine and an electric motor is provided. The control method includes: detecting the exhaust gas temperature of the gas turbine; and generating a motor torque instruction value for the electric motor based on the detected exhaust gas temperature.

The present invention provides a control technique capable of enhancing the operation efficiency of the compressor driven by a gas turbine and an electric motor.

BRIEF DESCRIPTION OF DRAWINGS

FIG. 12 is a control block diagram according to a seventh embodiment;

BEST MODE FOR CARRYING OUT THE INVENTION

Figure 1:
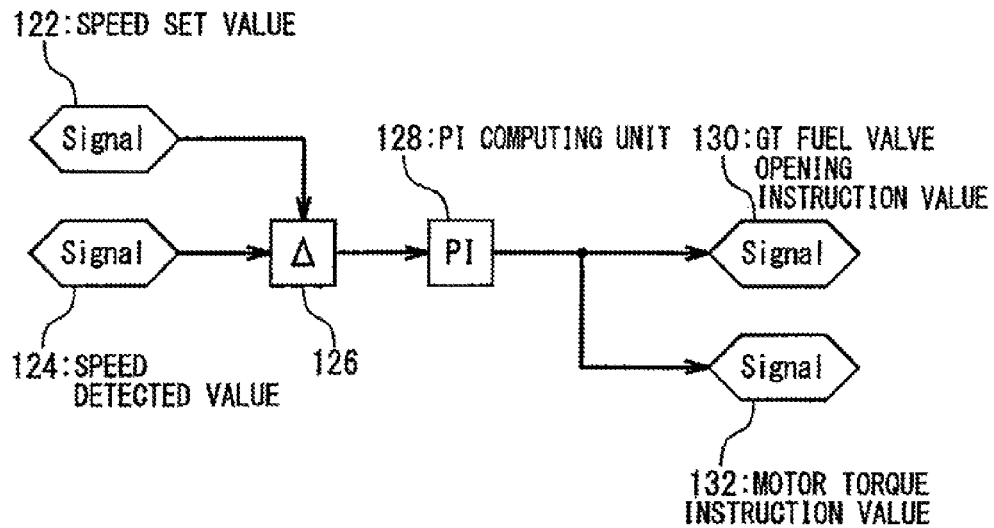
FIG. 1 is a reference example of a control block diagram.
Figure 2:
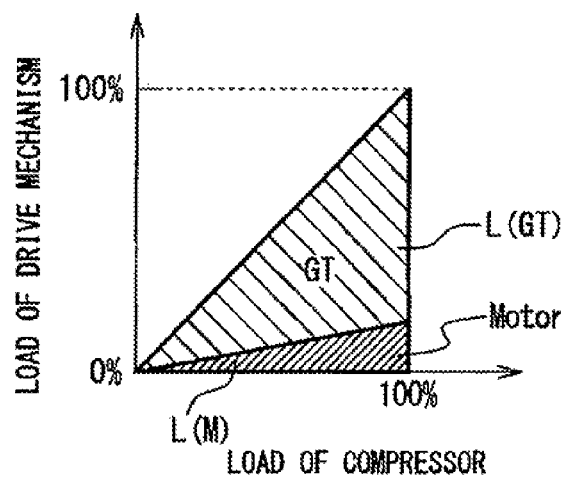
FIG. 2 is a reference example of a distribution method for a gas turbine load and an electric motor load.

Best modes for carrying out the present invention will be described hereinafter referring to the drawings.

Figure 3:
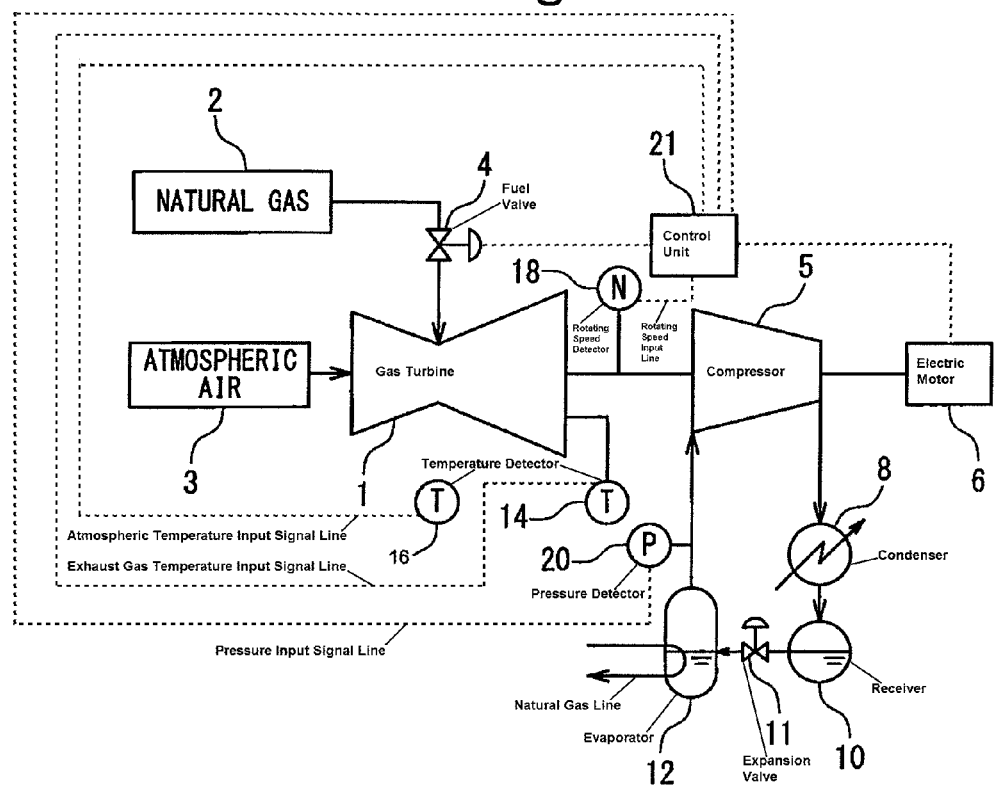
FIG. 3 shows a plant where a control according the present invention is performed.

FIG. 3 shows an example of a plant to which a compressor control apparatus and a compressor control method according to embodiments of the present invention are applied. This plant is a natural gas liquefaction plant.

Natural gas is supplied from a natural gas supply system 2 to a gas turbine 1 via a fuel valve 4. Atmospheric air 3 is also supplied to the gas turbine 1. In the gas turbine 1, the atmospheric air 3 and the natural gas are combusted and the combustion energy is converted into kinetic energy, thereby driving the gas turbine 1. Furthermore, a compressor 5 is coaxially connected to the gas turbine 1. The compressor 5 is driven by the drive power generated by the gas turbine 1 and an electric motor 6.

The compressor 5 compresses the refrigerant gas supplied from input-side piping of the cooling cycle and supplies the compressed refrigerant gas to a condenser 8 via output-side piping of the cooling cycle. In the condenser 8, the refrigerant gas is liquefied. The liquefied refrigerant is stored in a receiver 10 and then supplied to an evaporator 12 through an expansion valve 11. In the evaporator 12, the refrigerant is evaporated and temperature falls. Natural gas piping is provided in the evaporator 12 so as to make heat exchange between the natural gas and the refrigerant. By making the heat exchange between the natural gas and the refrigerant in the evaporator 12, a temperature of the natural gas falls and the natural gas is liquefied. The refrigerant evaporated in the evaporator 12 is supplied to the input-side piping of the compressor 5.

To perform control over such a plant, a temperature detector 14 detecting an exhaust gas temperature of the gas turbine 1 at a gas turbine outlet, a temperature detector 16 detecting an atmospheric temperature in an environment in which the gas turbine 1 is disposed, a rotating speed detector 18 detecting the rotating speed of the shaft of the compressor 5, and a pressure detector 20 detecting a pressure of the refrigerant on the input side of the compressor 5 are provided. A control apparatus 21 inputs signals detected by these detectors. The control apparatus controls the opening of the combustion valve 4 of the gas turbine 1 and the torque of the electric motor 6 based on those signals.

[First Embodiment]

In a control apparatus and a control method according to a first embodiment of the present invention, an exhaust gas temperature of the gas turbine is detected and the load of the gas turbine is estimated based on the detected exhaust gas temperature, whereby the compressor is driven by the gas turbine when the load of the gas turbine is low and by the combination of the gas turbine and the electric motor when the load of the gas turbine is high. By such a control, the gas turbine operates at a high load and high operation efficiency is attained.

Figure 4A:
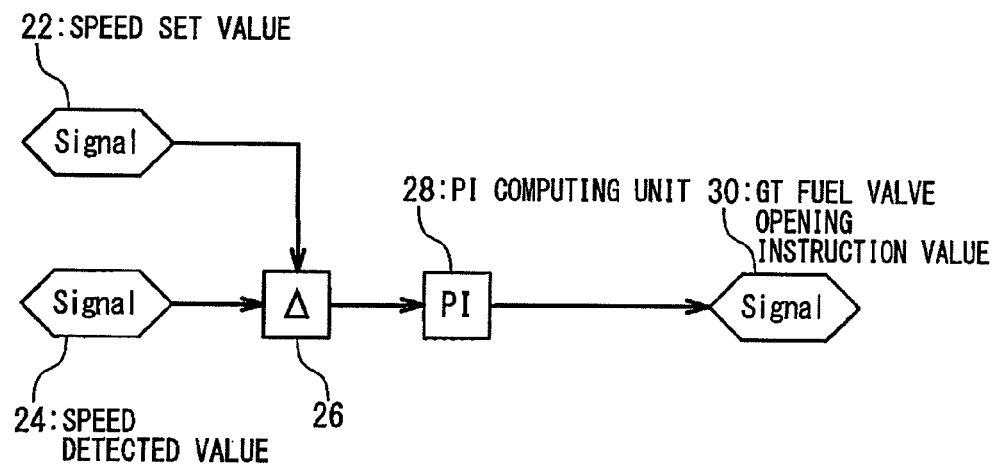
FIG. 4A is a control block diagram according to a first embodiment.
Figure 4B:
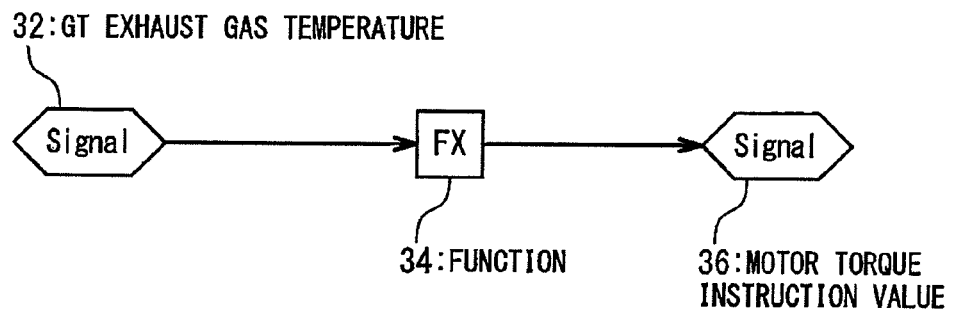
FIG. 4B is a control block diagram according to the first embodiment.

FIGS. 4A, 4B, 5A, and 5B are diagrams for explaining the control according to a first embodiment of the present invention. FIGS. 4A and 4B are control block diagrams of the control realized by the control apparatus 21. FIG. 4A shows a control block for controlling the opening of the fuel valve 4 of the gas turbine 1. A speed set value 22 is inputted to the control apparatus 21 from a control program, an input device or the like. A speed detected value 24 indicating a rotation speed obtained from the rotating speed of the shaft detected by the rotation speed detector 18 is further inputted to the control apparatus 21. A subtractor 26 calculates the deviation between the speed detected value 24 and the speed set value 22. A PI computing unit 28 executes a PI calculation based on the deviation and calculates an opening instruction value 30 for the combustion valve of the gas turbine so as to make the speed detected value 24 closer to the speed set value 22.

FIG. 4B is a control block diagram for controlling the torque of the electric motor 6. The temperature detector 14 detects an exhaust gas temperature of the gas turbine 1. A detected exhaust gas temperature 32 is inputted to the control apparatus 21. The control apparatus 21 stores therein a function 34 in advance so as to calculate a torque instruction value for the electric motor 6 based on the temperature. The control apparatus 21 converts the input exhaust gas temperature 32 into a torque instruction value 36 by the function 34. This function 34 is set to estimate the load of the gas turbine 1 from the exhaust gas temperature of the gas turbine 1 and to perform a control to increase the load of the electric motor 6 when the load of the gas turbine 1 is high.

Figure 5A:
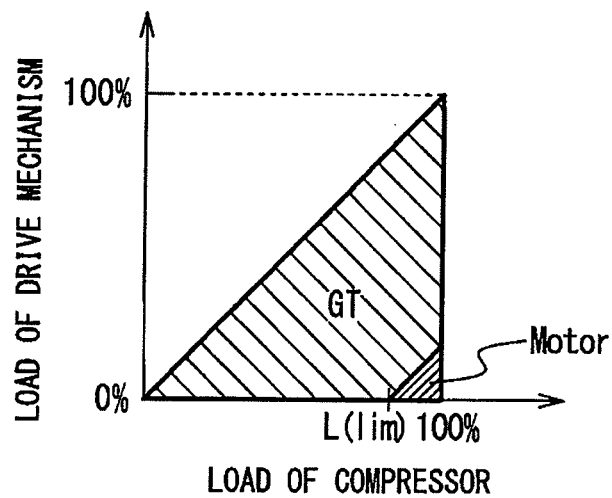
FIG. 5A is a chart for explaining an electric motor load according to the first embodiment.
Figure 5B:
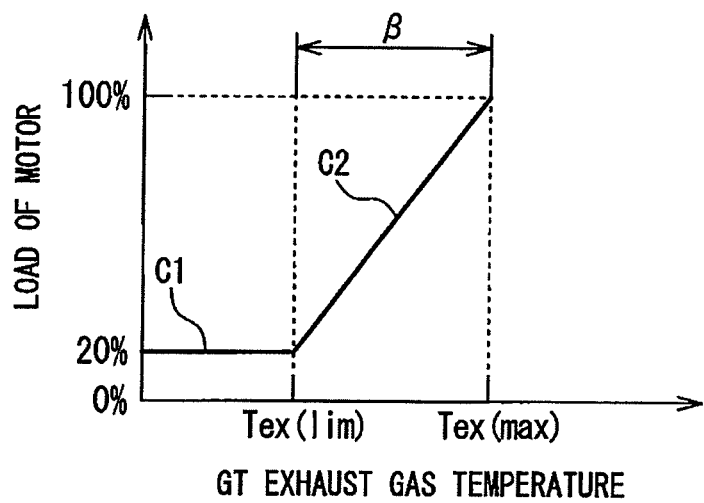
FIG. 5B is a chart for explaining the electric motor load according to the first embodiment.

FIGS. 5A and 5B are charts for explaining the electric motor load and the gas turbine load controlled by the control apparatus 21. FIG. 5B illustrates the function 34 stored in a storage device of the control apparatus 21. The horizontal axis of FIG. 5B indicates the exhaust gas temperature of the gas turbine 1 detected by the temperature detector 14, and the vertical axis thereof indicates the load of the electric motor 6. In the example of FIG. 5B, the function 34 is set so that the electric motor load C1 is a value of a predetermined ratio (20%) with respect to the maximum load of the electric motor 6 when the exhaust gas temperature 32 is equal to or is lower than Tex (lim). The function 34 is set so that the electric motor load C2 increases at a certain change rate with respect to the change in the exhaust gas temperature 32 when the exhaust gas temperature 32 is in a range equal to or higher than Tex (lim) and equal to or lower than Tex (max). The value 20% of the electric motor load $C1m$, when the exhaust gas temperature 32 is low, is a margin to prevent the electric motor 6 from operating as a generator if the load of the electric motor 6 is excessively reduced.

The Tex (lim) is a minimum value of the exhaust gas temperature 32 at which the compressor 5 can be driven to operate solely by the gas turbine. Namely, as long as the exhaust gas temperature 32 is equal to or higher than the Tex (lim), the gas turbine 1 can be entirely responsible for the load of the compressor 5 if the load of the gas turbine 1 is set to 100%. The Tex (max) is a maximum value of the exhaust gas temperature of the gas turbine 1, which is preset and registered in the control apparatus 21.

By performing the control using such a function, a load distribution shown in FIG. 5A is realized. When the load of the compressor 5 shown in the horizontal axis is low, the gas turbine 1 solely supplies the load of driving mechanism for driving the compressor 5 (while, for brevity of description, disregarding the load responsible for the electric motor 6 resulting from the margin 20% of the load of the electric motor shown in FIG. 5B). L (lim) shown on the horizontal axis indicates the load of the compressor 5 when the exhaust gas temperature of the gas turbine 1 reaches Tex (lim) by single operation of the gas turbine 1. In the range in which the load of the compressor 5 is higher than the L (lim), the gas turbine 1 cannot be solely responsible for the load of the compressor 5. In this range, the electric motor torque rises and the sum of the gas turbine load L (GT) and the electric motor load L (M) drives the compressor 5 as a driving mechanism load.

Under such a control, the gas turbine 1 is mainly responsible for the load of the driving mechanism and the electric motor 6 is additionally used when the load of the gas turbine 1 is insufficient. Due to this, the gas turbine 1 is driven to operate at a high load and the high operation efficiency is attained.

[Second Embodiment]

A second embodiment of the present invention is realized by partially changing the control performed by the control apparatus 21 according to the first embodiment. Changed points will be described below.

The total load of the driving mechanism is the sum of the load of the gas turbine 1 and that of the electric motor 6. The relationship between the gas turbine 1 and the electric motor 6 is that the gas turbine 1 and the electric motor 6 interfere with each other as driving mechanism. Namely, when the electric motor load is raised, the load of the gas controlled to have a constant speed falls, and vice versa. This indicates that a fluctuation in the electric motor load becomes merely a disturbance in a speed control of the gas turbine. Due to this, it is preferable to set the electric motor load as constant as possible. Accordingly, after a rise of the exhaust gas temperature (Tex) of the gas turbine 1, for the electric motor load being not changed soon even when the exhaust gas temperature (Tex) falls, a temperature hysteresis is given at a margin width of γ (ΔTex), and the electric motor torque is not changed during time corresponding to the temperature hysteresis. γ is determined by giving margins to a change in the exhaust gas temperature of the gas turbine and a change in the electric motor torque during stationary operation and registered in the control apparatus 21.

Figure 6:
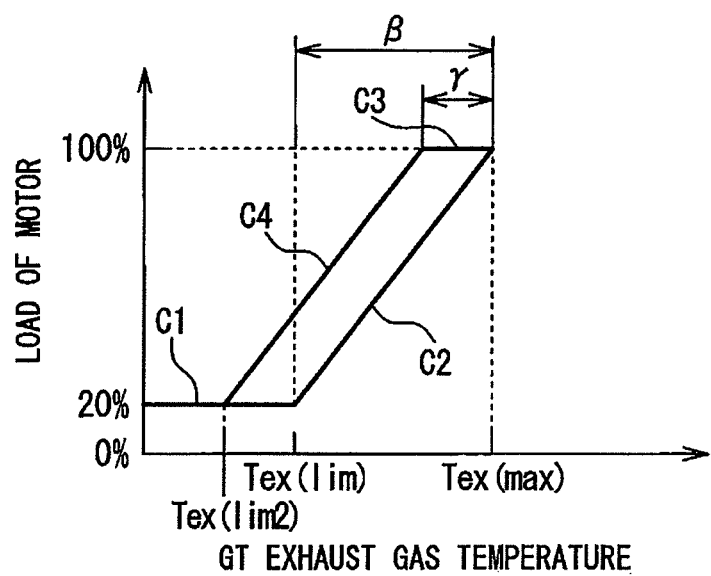
FIG. 6 is a chart for explaining an electric motor load according to a second embodiment.

FIG. 6 is a chart for explaining the electric motor load controlled by the control apparatus 21 according to a second embodiment. First, when the exhaust gas temperature 32 of the gas turbine 1 detected by the temperature detector 14 is rising, then the same function 34 as that used in the first embodiment is set in a range equal to or lower than Tex (lim) and in a range equal to or higher than Tex (lim) and equal to or lower than Tex (max), and same control as that according to the first embodiment is performed.

Next, a period in which the exhaust temperature 32 of the gas turbine 1 temporarily rises from the Tex (lim) and is then falling will be considered. In the first embodiment, the control is performed to reduce the electric motor load as the exhaust gas temperature 32 starts falling. In the second embodiment, the setting of the function 34 is changed and an electric motor load C3 is kept constant until the falling width of the exhaust gas temperature 32 becomes γ. When the falling width of the exhaust gas temperature 32 exceeds γ, the torque instruction value 36 is outputted so that an electric motor load C4 falls at a certain reduction rate with respect to the exhaust gas temperature 32. When the exhaust gas temperature 32 stops falling and starts rising, the electric motor load is kept constant until the rising width of the temperature reaches γ. When the temperature rises so that the rising width exceeds γ, the electric motor load C2 increases. In a range of the exhaust gas temperature 32 in which the exhaust gas temperature is lower than Tex (lim2)=Tex (lim)−γ, the electric motor load is kept constant. By this control, the load of the compressor can be controlled so as not to cause the interference between the gas turbine and the electric motor.

[Third Embodiment]

A third embodiment of the present invention realizes the control corresponding to a change in gas turbine performance by an atmospheric temperature by partially changing the control performed by the control apparatus 21 according to the first embodiment.

Figure 7A:
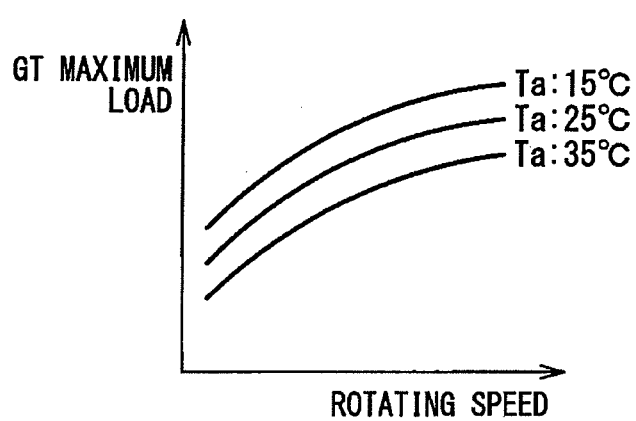
FIG. 7A shows a relationship between an atmospheric temperature and a maximum driving power of a gas turbine.
Figure 7B:
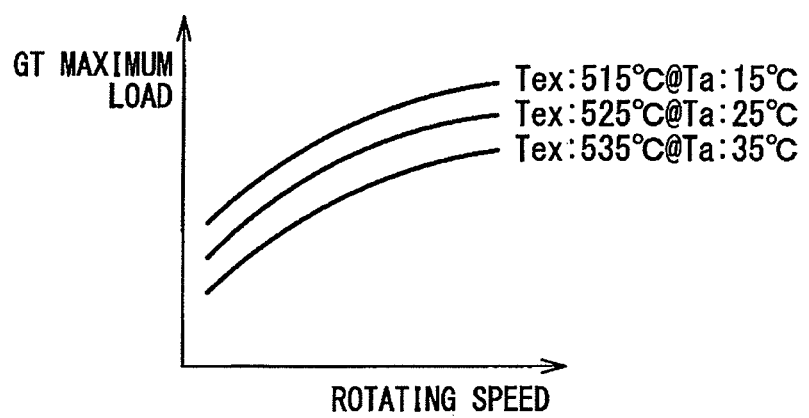
FIG. 7B shows a relationship between a maximum exhaust gas temperature of the gas turbine and the maximum driving power of the gas turbine.

The gas turbine performance changes dependently on atmospheric temperature (an intake-air temperature of the gas turbine). As compared with a low atmospheric temperature, the maximum load of the gas turbine falls when the atmospheric temperature is high. FIG. 7A shows an example of the relationships between the rotation speed and the maximum driving power of the gas turbine when the atmospheric temperature Ta is different to each other. Furthermore, according to the atmospheric temperature, the exhaust gas temperature changes and the maximum exhaust gas temperature changes. FIG. 7B shows an example of the relationships between the rotating speed and the maximum driving power of the gas turbine when the maximum exhaust gas temperature Tex is different to each other.

Figure 8:
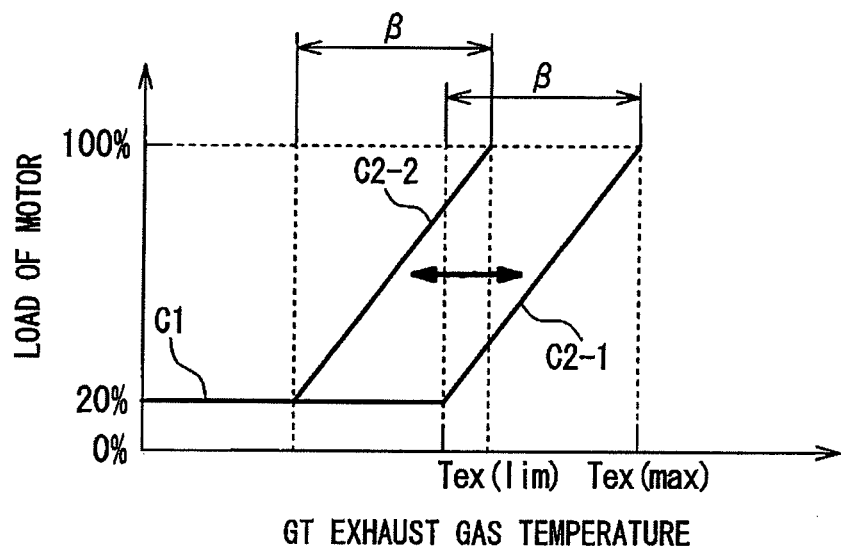
FIG. 8 is a chart for explaining an electric motor load according to a third embodiment.

FIG. 8 is a chart for explaining an electric motor load under a control performed by the control apparatus 21 according to the third embodiment. The control apparatus 21 stores therein correspondences between an atmospheric temperature and a value set as the maximum exhaust gas temperature. The atmospheric temperature detected by the temperature detector 16 is inputted to the control apparatus 21, and the control apparatus 21 sets the maximum exhaust gas temperature corresponding to the atmospheric temperature in the correspondence stored therein to the Tex (max) described in the first embodiment. The control apparatus 21 stores therein a change rate of the electric motor load with respect to a change amount of the gat turbine exhaust gas temperature in advance. The Tex (lim) is decided by this change rate and the Tex (max). By determining values of Tex (lim) and Tex (max), the function 34 shown in FIG. 8 is set. When the detected atmospheric temperature is higher, the function 34 is set so that the electric motor load C2-1 relative to the exhaust gas temperature that is equal to or higher than Tex (lim) and equal to or lower than Tex (max) is located on a righter side in FIG. 8. When the detected atmospheric temperature is lower, the function 34 is set so that the electric motor load C2-2 relative to the exhaust gas temperature that is equal to or higher than Tex (lim) and equal to or lower than Tex (max) is located on lefter side in FIG. 8.

Such a control can be performed by registering the maximum temperature of exhaust gas of the gas turbine in place of the atmospheric temperature in advance and using the registered maximum temperature of the exhaust gas of the gas turbine as Tex (max).

By performing such a control using the function 34, even if the atmospheric temperature or the maximum exhaust gas temperature of the gas turbine changes, it is possible to perform control so that the electric motor load becomes the maximum value at the maximum output of the gas turbine, that is, when the gas turbine cannot apply the load any more. It is possible to cause the gas turbine to operate at low fuel consumption with higher efficiency according to the atmospheric temperature or the temperature of the gas turbine.

[Fourth Embodiment]

A control according to a fourth embodiment of the present invention is realized by adding the hysteresis control described in the second embodiment to the control according to the third embodiment.

Figure 9:
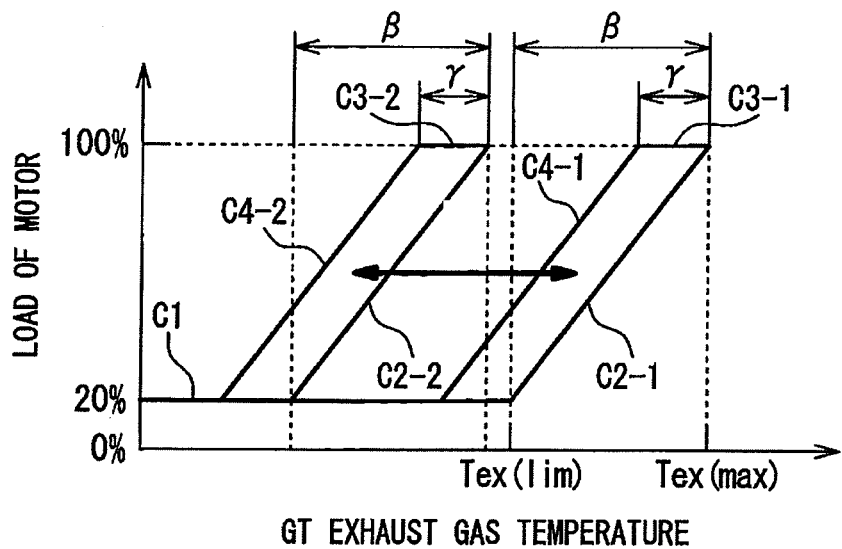
FIG. 9 is a chart for explaining an electric motor load according to a fourth embodiment.

FIG. 9 is a chart for explaining the electric motor load under control performed by the control apparatus 21 according to a fourth embodiment. The control apparatus 21 determines values of Tex (lim) and Tex (max) based on a temperature detected by the temperature detector 16. When the detected exhaust gas temperature 32 reaches the maximum exhaust gas temperature Tex (max) registered in the control apparatus 21 in advance and then the exhaust gas temperature starts falling, hysteresis control similar to the control according to the second embodiment is performed.

[Fifth Embodiment]

A fifth embodiment of the present invention is realized by partially changing the control performed by the control apparatus 21 according to each of the first to fourth embodiments. Changed points will be described below.

When the electric motor 6 does not have a regeneration function (does not have a generator function), then no load is applied to the electric motor when the load of the compressor rapidly changes and the electric motor acts as a generator (backward current), and there is a possibility that the electric motor trips. According to a fifth embodiment, a protection circuit is provided, whereby the torque instruction value for the electric motor 6 is increased by a step change to prevent the electric motor from acting as a generator when the current rapidly drops.

Figure 10:
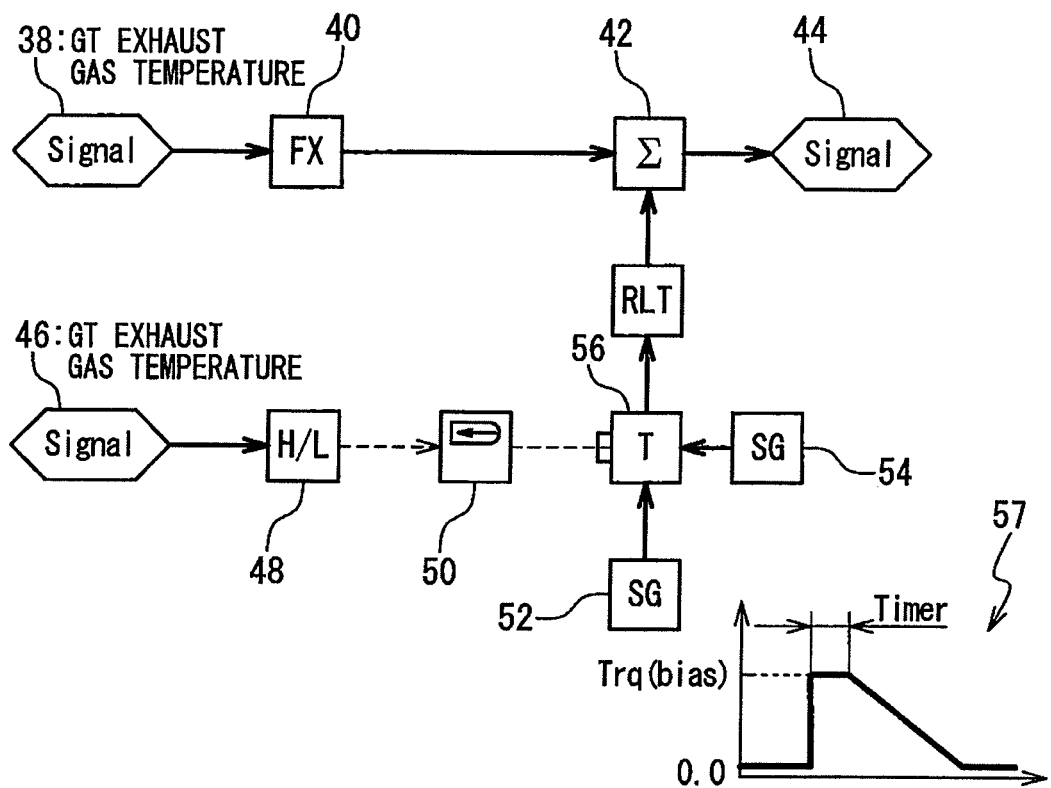
FIG. 10 is a control block diagram according to a fifth embodiment.

FIG. 10 is a control block diagram for explaining an operation performed by the protection circuit included in the control apparatus 21. Similarly to the first embodiment, a detected exhaust gas temperature 38 of the gas turbine 1 is inputted to the control apparatus 21 and converted into the torque instruction value 36 for the electric motor 6 by a function 40 stored in the control apparatus 21 in advance. An adder 42 adds a correction amount to this torque instruction value 36.

The current driving the electric motor 6 is detected and a current detection value 46 corresponding to the detected current is inputted to the control apparatus 21. A low value detector 48 transmits a low value detection signal when the current detection value 46 is equal to or smaller than a predetermined value (e.g., 10.0%) with respect to a value registered in advance such as the rated current of the electric motor 6. In response to transmission of the low value detection signal, a timer 50 transmits a hold signal for a predetermined period of time. A switch 56 normally outputs a signal (indicating bias torque 0) inputted from a signal generator 52. During the period in which the hold signal is transmitted, the switch 56 outputs a signal indicating a bias torque of a predetermined value inputted from a signal generator 54. The bias torque signal is inputted to the adder 42 via a change rate limiter RLT. A graph 57 in a lower right of FIG. 10 shows an output from the change rate limiter RLT before and after the low value detector 48 transmits the low value detection signal. The adder 42 summates a value of the function 40 and an output value from the change rate limiter RLT and outputs the sum as the torque instruction value 36.

By such a control, when the load of the electric motor 6 rapidly falls, the torque instruction value 36 is temporarily increased by a step change. Due to this, even if the electric motor 6 does not include a regeneration function, it is possible to avoid the electric motor trip and to cause the compressor 5 to continuously operate.

[Sixth Embodiment]

A sixth embodiment of the present invention is realized by changing the control performed by the control apparatus 21 according to the first embodiment. Changed points will be described below.

In the first embodiment, the motor torque instruction value is controlled by the proportional control using a function of the exhaust gas temperature. In the sixth embodiment, a feedback control is performed in place of the control according to the first embodiment so as to make the exhaust gas temperature closer to a set maximum temperature.

Figure 11:
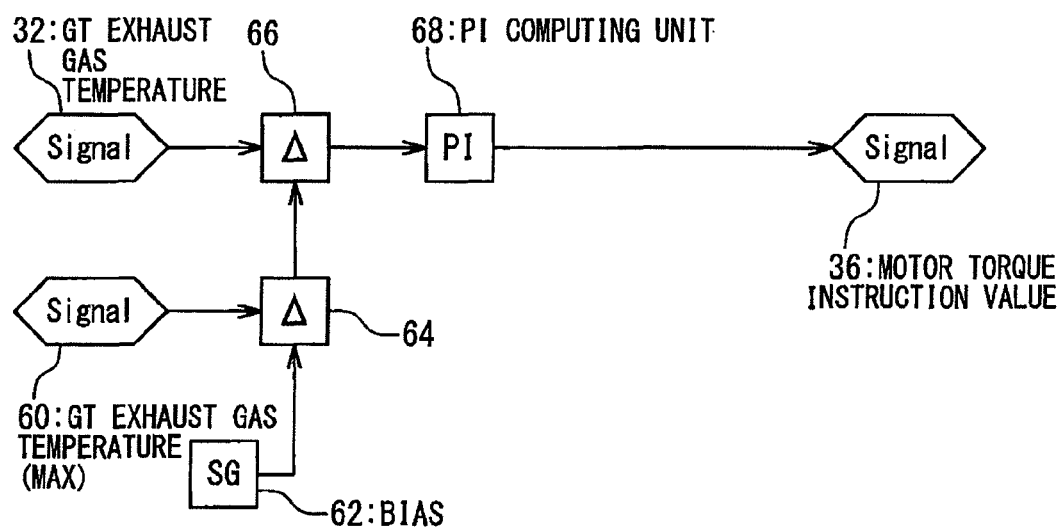
FIG. 11 is a control block diagram according to a sixth embodiment.

FIG. 11 is a control block diagram according to the sixth embodiment. A subtractor 64 calculates the difference between a set maximum value Tex (max) 60 of the exhaust gas of the gas turbine 1 registered in the control apparatus 21 in advance and a predetermined bias value generated by a signal generator 62. This bias value is a value for controlling the exhaust gas temperature of the gas turbine 1 to be slightly lower than the maximum value. The temperature detector 14 detects the exhaust gas temperature of the gas turbine 1. A subtractor 66 calculates the difference between the exhaust gas temperature 32 and the difference outputted from the subtractor 64. A PI computing unit 68 makes the PI calculation so that the difference outputted from the subtractor 66 becomes smaller and outputs a torque instruction value 36 of the electric motor 6.

By such a control, the gas turbine is operated in a condition that the temperature of the exhaust gas is close to the maximum temperature. Due to this, the compressor 5 is driven with high efficiency. The control according to the present embodiment can be realized in combination with the control of the fifth embodiment performed when the electric motor load is lower than a predetermined reference value. Furthermore, it is also possible to perform the control with hysteresis characteristic as described in the second embodiment. When the torque instruction value 36 exceeds a predetermined reference value, after that, the control can be performed so that the exhaust gas temperature is kept to be a constant value at a predetermined exhaust gas temperature width even if the torque instruction value 36 is below the reference value.

[Seventh Embodiment]

A seventh embodiment of the present invention is realized by adding a speed control over the shaft of the compressor 5 to the control performed in the control apparatus 21 according to the sixth embodiment.

FIG. 12 is a control block diagram of the control apparatus 21 according to the seventh embodiment. In FIG. 12, blocks denoted by the same numbers as those shown in FIG. 11 operate similarly to those described referring to FIG. 11, respectively. However, an adder 76 and a signal line through which an output of the PI computing unit 68 diverges to an input of a multiplier 80 are inserted between the PI computing unit 68 and the torque instruction value 36. The multiplier 80 multiplies the output from the PI computing unit 68 by a predetermined value generated by a signal generator 78. The result of the multiplication is inputted to an adder 82.

The subtractor 64 calculates the difference between the rotation speed detected value 24 obtained from the rotating speed of the shaft detected by the rotating speed detector 18 and the speed set value 22 inputted from a control program or an input device. The PI computing unit 28 makes a PI calculation so that the difference outputted from the subtractor 26 becomes smaller. The adder 82 outputs the opening instruction value 30 for the gas turbine fuel valve 4 that is a value obtained by adding an output from the multiplier 80 to the output value from the PI computing unit 28. A multiplier 74 multiplies the output from the PI computing unit 28 by a predetermined value generated from a signal generator 72. A result of the multiplication is inputted to the adder 76. The adder 76 outputs the torque instruction value 36 for the electric motor 6 that is a value obtained by adding an output from the multiplier 74 to the output from the PI computing unit 68.

By appropriately setting the values outputted from the signal generators 72 and 78 under such a control, the effects similar to those in the case of exhaust gas temperature control can be realized, and the interference between the electric motor 6 and the gas turbine 1 can be reduced, and controllability can be improved.

[Eighth Embodiment]

An eighth embodiment of the present invention is realized by adding control over the exhaust gas temperature of the gas turbine to the control performed by the control apparatus 21 according to the first embodiment.

When the exhaust gas temperature is low, the gas turbine 1 operates under the speed control based on the rotating speed of the shaft detected by the rotating speed detector 18. When the exhaust gas temperature is close to a preset maximum temperature, the gas turbine 1 operates under the exhaust gas temperature control based on the exhaust gas temperature. The control apparatus 21 according to the eighth embodiment controls the torque of the electric motor 6 in accordance with a control mode signal indicating whether the control over the gas turbine 1 is the speed control or the exhaust gas temperature control.

Figure 13A:
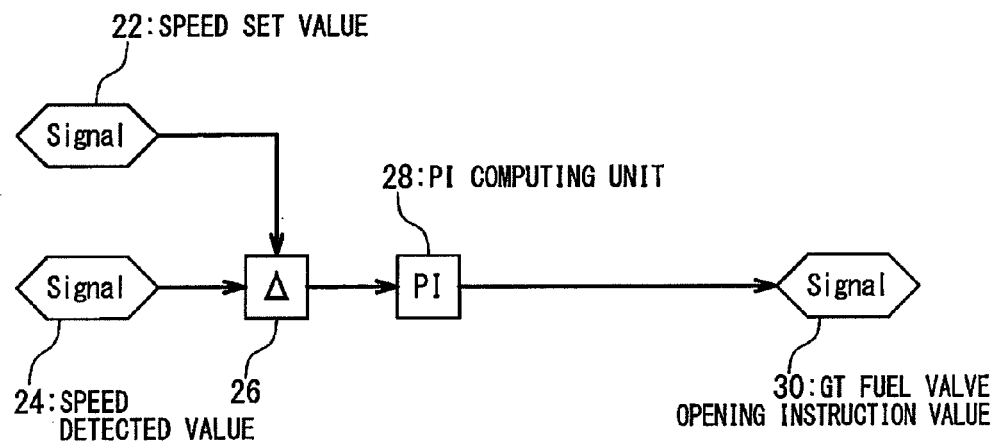
FIG. 13A is a control block diagram according to an eighth embodiment.
Figure 13B:
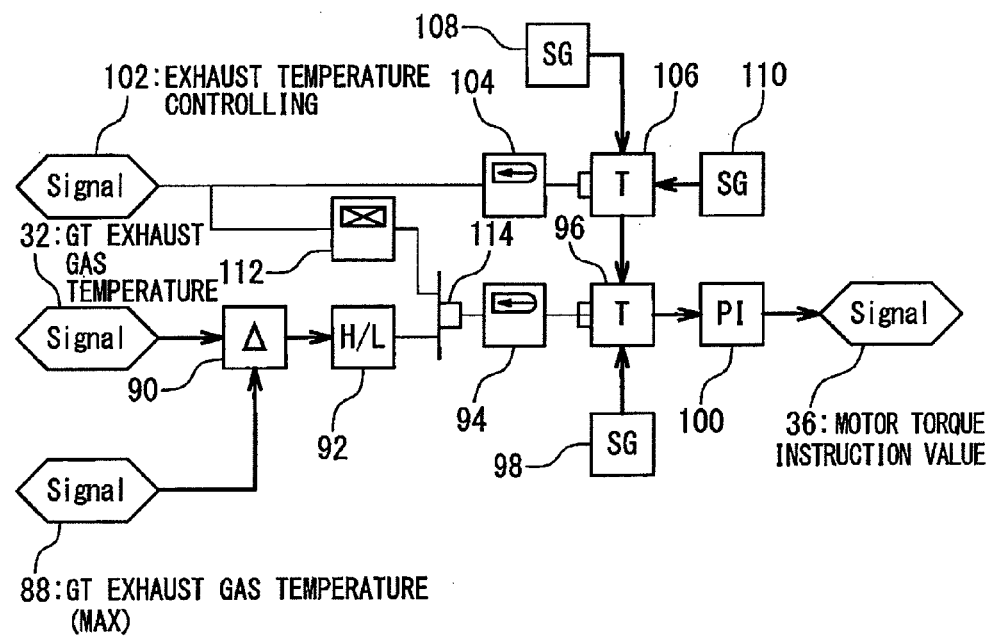
FIG. 13B is a control block diagram according to the eighth embodiment.

FIGS. 13A and 13B are control block diagrams of the control apparatus 21. As shown in FIG. 13A, the control based on the rotation speed of the shaft detected by the rotating speed detector 18 is performed similarly to the control according to the first embodiment.

FIG. 13B shows the control based on the exhaust gas temperature of the gas turbine 1. A control mode signal 102 indicating a control mode for the gas turbine 1 is inputted to the control apparatus 21. The control mode signal 102 has an OFF value when the gas turbine 1 is under the speed control and has an ON value when the gas turbine is under the exhaust gas temperature control. The exhaust gas temperature 32 detected by the temperature detector 14 and a preset maximum exhaust gas temperature 88 of the gas turbine 1 are further inputted to the control apparatus 21.

First, control performed when the exhaust gas temperature of the gas turbine 1 is close to the maximum exhaust gas temperature will be described. The ON signal is inputted to the control apparatus 21 as the control mode signal 102. This ON signal is converted into the OFF signal by a NOT element 112 and the OFF signal is inputted to an AND element 114. Due to this, an output from a low value detector 92 is not outputted to subsequent stages and a switch 96 outputs an input from a switch 106. After a timer 104 starts and a predetermined waiting time passes, the switch 106 that has outputted a value 0 generated by a signal generator 108 by that moment is switched to output a motor torque increase value generated by a signal generator 110. This increase value is inputted to a torque instruction value computing unit 100 (to which a torque instruction value change rate is inputted, which outputs a torque instruction value, and which can be realized, for example, by a PI computing unit) via the switch 96. The torque. instruction value computing unit 100 generates a torque instruction value 36 so that the torque of the electric motor 6 increases by the increase value generated by the signal generator 110. As a result, while the gas turbine 1 operates around at the maximum output, the control is performed to increase the load of the electric motor 6 and to compensate for the load of the compressor 5.

Next, a control performed when the exhaust gas temperature of the gas turbine 1 is lower than the maximum exhaust gas temperature will be described. The OFF signal is inputted to the control apparatus 21 as the control mode signal 102. This OFF signal is converted into the ON signal by the NOT element 112 and the ON signal is inputted to the AND element 114. The subtractor 92 outputs the difference between the detected exhaust gas temperature 32 and the maximum exhaust air temperature 88. The low value detector 92 outputs a low value detection signal when this difference is equal to or is smaller than a predetermined value, that is, when the exhaust gas temperature of the gas turbine is equal to or is lower than a predetermined rate with respect to the maximum exhaust gas temperature. A timer 94 outputs the low value detection signal to the switch 96 after a predetermined waiting time. The switch 96 that has outputted the value generated by the timer 106 by that moment outputs a motor torque decrease value of −10.0 generated by the signal generator 98 when the low value detection signal is inputted to the switch 96. The torque instruction value computing unit 100 generates the torque instruction value 36 so that the torque of the electric motor 6 decreases by the decrease value generated by the signal generator 98. As a result, when the output from the gas turbine 1 is lower than the maximum output by a predetermined reference value or more, the load of the electric motor 6 decreases. As a consequence, the load of the gas turbine 1 increases, the gas turbine 1 operates in a range close to the maximum output, and the control with high operation efficiency can be realized.

[Ninth Embodiment]

Figure 14:
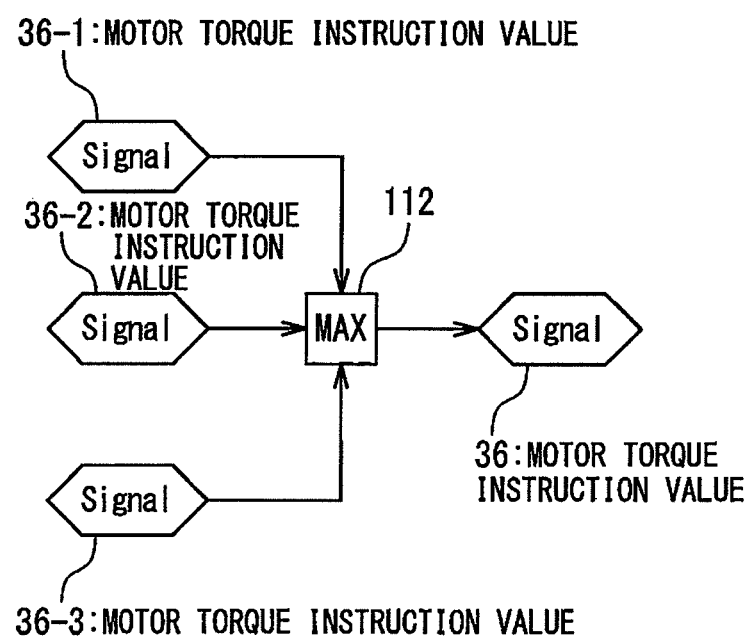
FIG. 14 is a control block diagram according to a ninth embodiment.

A ninth embodiment of the present invention is realized by adding a function of a control block shown in FIG. 14 to the control apparatus 21 shown in FIG. 3. Each of a plurality of motor torque instruction value candidates 36-1 to 36-3 is the torque instruction value 36 outputted under the control according to any one of the first to eighth embodiments. A maximum value selector 112 selects a maximum value from among the plurality of motor torque instruction value candidates 36-1 to 36-3 and outputs the selected maximum value as the torque instruction value 36. By such a control, even if the detected value of the exhaust gas temperature of the gas turbine, the set value of the maximum exhaust gas temperature or the like is erroneously inputted, it is possible to ensure outputting the motor torque instruction value sufficient to compensate for the gas turbine output.

Any two or more embodiments out of the first to ninth embodiments described so far can be combined as long as no contradiction occurs.

The invention claimed is:

1. A control apparatus for controlling a compressor driven by a driving unit generating driving power by a gas turbine and an electric motor, the control apparatus comprising:
   a temperature detection section configured to detect an exhaust gas temperature of the gas turbine; and
   a control section configured to generate a motor torque instruction value for the electric motor based on the detected exhaust gas temperature,
   wherein the control section is configured to store a function, generate a function value by substituting an argument of the function for the detected exhaust gas temperature as the motor torque instruction value.

2. A control apparatus for controlling a compressor driven by a driving unit generating driving power by a gas turbine and an electric motor, the control apparatus comprising:

a temperature detection section configured to detect an exhaust gas temperature of the gas turbine; and a control section configured to generate a motor torque instruction value for the electric motor based on the detected exhaust gas temperature, wherein the control section is configured to generate the motor torque instruction value to reduce a deviation between the detected exhaust gas temperature and an inputted temperature set value.

3. A control apparatus for controlling a compressor driven by a driving unit generating driving power by a gas turbine and an electric motor, the control apparatus comprising:

a temperature detection section configured to detect an exhaust gas temperature of the gas turbine; and a control section configured to generate a motor torque instruction value for the electric motor based on the detected exhaust gas temperature, wherein the control section is configured to perform a speed control by generating a gas turbine fuel valve opening instruction value of the gas turbine based on a speed detection value being a detected value of a revolution speed of the compressor and an inputted speed set value.

4. The control apparatus according to claim 3, wherein the control section is configured to:

generate a temperature dependent instruction value based on the detected exhaust gas temperature and distribute the temperature dependent instruction value into the motor torque instruction value and the gas turbine fuel valve opening instruction value; and generate a speed dependent instruction value for a deviation between the speed detection value and the speed set value to become smaller and distribute the speed dependent instruction value into the motor torque instruction value and the gas turbine fuel valve opening instruction value.

5. The control apparatus according to claim 3, wherein the control section changes the speed control to an exhaust gas temperature control in which the gas turbine fuel valve opening instruction value is generated based on the exhaust gas temperature when the detected exhaust gas temperature exceeds a predetermined level, and the control section starts increasing the motor torque instruction value when the speed control is changed to the exhaust gas temperature control.

6. The control apparatus according to claim 3, wherein the control section is configured to control a ratio of the motor torque instruction value to the gas turbine fuel valve opening instruction value such that the higher the detected exhaust gas temperature is, the larger the ratio is, when the detected exhaust gas temperature is in a predetermined temperature range.

7. The control apparatus according to claim 6, wherein the control section is configured to control the ratio to be constant in a period where the detected exhaust gas temperature is in a predetermined temperature width when the detected exhaust gas temperature decreases after the ratio becomes a predetermined maximum value.

8. The control apparatus according to claim 6, wherein the control section is configured to set an upper limit of the predetermined temperature range to an inputted maximum exhaust gas temperature, and generate the motor torque instruction value such that a power of the electric motor becomes maximum when the detected exhaust gas temperature is the upper limit of the predetermined temperature range.

9. The control apparatus according to claim 6, further comprising:

an atmospheric air temperature detection section configured to detect an atmospheric air temperature; and a storage section configured to store a correspondence relation between the atmospheric air temperature and a maximum temperature value set as a maximum exhaust gas temperature, wherein the control section is configured to:

set an upper limit of the predetermined temperature range to be the maximum temperature value corresponding to the detected atmospheric air temperature in the correspondence relation; and generate the motor torque instruction value such that a power of the electric motor becomes maximum when the detected exhaust gas temperature is at the upper limit of the predetermined temperature range.

10. A control apparatus for controlling a compressor driven by a driving unit generating driving power by a gas turbine and an electric motor, the control apparatus comprising:

a temperature detection section configured to detect an exhaust gas temperature of the gas turbine; and a control section configured to generate a motor torque instruction value for the electric motor based on the detected exhaust gas temperature, wherein the control section is configured to add a predetermined value to the motor torque instruction value for a predetermined period when a load of the driving unit decreases at a change rate larger than a predetermined level.

11. A control apparatus for controlling a compressor driven by a driving unit generating driving power by a gas turbine and an electric motor, the control apparatus comprising:

a temperature detection section configured to detect an exhaust gas temperature of the gas turbine; and a control section configured to generate a motor torque instruction value for the electric motor based on the detected exhaust gas temperature, wherein the control section is configured to:

generate a plurality of motor torque instruction value candidates among from a first motor torque instruction value candidate to a ninth motor torque instruction value candidate; and determine the motor torque instruction value to be a maximum of the plurality of motor torque instruction value candidates, wherein the first motor torque instruction value candidate is generated by generating a function value by substituting an argument of a function preliminary stored in the control section for the detected exhaust gas temperature, wherein the second motor torque instruction value candidate is generated to reduce a deviation between the detected exhaust gas temperature and an inputted temperature set value, wherein the third motor torque instruction value candidate is generated by:

generating a temperature dependent instruction value based on the detected exhaust gas temperature and distributing the temperature dependent instruction value into the third motor torque instruction value candidate and a gas turbine fuel valve opening instruction value; and generating a speed dependent instruction value for a deviation between a speed detection value and a speed set value to become smaller and distributing the speed dependent instruction value into the third motor torque instruction value candidate and the gas turbine fuel valve opening instruction value, wherein the fourth motor torque instruction value candidate is generated to be increased when a control of the gas turbine is changed from a speed control to an exhaust gas temperature control, wherein the speed control is a control for generating the gas turbine fuel valve opening instruction value of the gas turbine based on the speed detection value being a detected value of a revolution speed of the compressor and an inputted speed value, wherein the exhaust gas temperature control is a control changed from the speed control when the detected exhaust gas temperature exceeds a predetermined level, and the gas turbine fuel valve opening instruction value is generated based on the detected exhaust gas temperature, wherein the fifth motor torque instruction value candidate is generated to control a ratio of the gas turbine fuel valve opening instruction value to the motor torque instruction value such that the higher the detected exhaust gas temperature is, the larger the ratio is, when the detected exhaust gas temperature is in a predetermined temperature range, wherein the sixth motor torque instruction value candidate is generated to control the ratio of the gas turbine fuel valve opening instruction value to the motor torque instruction value such that the higher the detected exhaust gas temperature is, the larger the ratio is, when the detected exhaust gas temperature is in the predetermined temperature range, and is generated to control the ratio to be constant in a period where the detected exhaust gas temperature is in a predetermined temperature width when the detected exhaust gas temperature decreases after the ratio becomes a predetermined maximum value, wherein the seventh motor torque instruction value candidate is generated to control the ratio of the gas turbine fuel valve opening instruction value to the motor torque instruction value such that the higher the detected exhaust gas temperature is, the larger the ratio is, when the detected exhaust gas temperature is in the predetermined temperature range, generated to set an upper limit of the predetermined temperature range to an inputted maximum exhaust gas temperature, and generated such that a power of the electric motor becomes maximum when the detected exhaust gas temperature is the upper limit of the predetermined temperature range, wherein the eighth motor torque instruction value candidate is generated to control the ratio of the gas turbine fuel valve opening instruction value to the motor torque instruction value such that the higher the detected exhaust gas temperature is, the larger the ratio is, when the detected exhaust gas temperature is in the predetermined temperature range, and is generated such that the power of the electric motor becomes maximum when the detected exhaust gas temperature is the upper limit of the predetermined temperature range, wherein the upper limit of the predetermined temperature range is set to be a maximum exhaust gas temperature corresponding to a detected atmospheric air temperature referring to a correspondence relation between the atmospheric air temperature and a maximum temperature value set as the maximum exhaust gas temperature, and wherein the ninth motor torque instruction value candidate is generated by adding a predetermined value to the motor torque instruction value when a load of the driving unit decreases at a change rate larger than a predetermined level.

12. A control method for controlling a compressor driven by a driving unit generating driving power by a gas turbine and an electric motor, the control method comprising:

detecting an exhaust gas temperature of the gas turbine; and generating, via a control section, a motor torque instruction value for the electric motor based on the detected exhaust gas temperature, wherein, in the generating, the motor torque instruction value is generated by generating a function value by substituting an argument of a function stored in the control section for the detected exhaust gas temperature.

13. The control method according to claim 12, wherein in the generating, the motor torque instruction value is generated to reduce a deviation between the detected exhaust gas temperature and an inputted temperature set value.

14. The control method according to claim 12, wherein a speed control is performed by generating a gas turbine fuel valve opening instruction value of the gas turbine based on a speed detection value being a detected value of a revolution speed of the compressor and an inputted speed set value.

15. The control method according to claim 12, further comprising:

adding a predetermined value to the motor torque instruction value for a predetermined period when a load of the driving unit decreases at a change rate larger than a predetermined level.

16. The control method according to claim 12, wherein the generating comprises:

generating a plurality of motor torque instruction value candidates among from a first motor torque instruction value candidate to a ninth motor torque instruction value candidate; and determining the motor torque instruction value to be a maximum of the plurality of motor torque instruction value candidates, wherein the first motor torque instruction value candidate is generated by generating a function value by substituting an argument of a function preliminary stored in the control section for the detected exhaust gas temperature, wherein the second motor torque instruction value candidate is generated to reduce a deviation between the detected exhaust gas temperature and an inputted temperature set value, wherein the third motor torque instruction value candidate is generated by:

generating a temperature dependent instruction value based on the detected exhaust gas temperature and distributing the temperature dependent instruction value into the third motor torque instruction value candidate and a gas turbine fuel valve opening instruction value; and generating a speed dependent instruction value for a deviation between a speed detection value and a speed set value to become smaller and distributing the speed dependent instruction value into the third motor torque instruction value candidate and the gas turbine fuel valve opening instruction value, wherein the fourth motor torque instruction value candidate is generated to be increased when a control of the gas turbine is changed from a speed control to an exhaust gas temperature control, wherein the speed control is a control for generating the gas turbine fuel valve opening instruction value of the gas turbine based on the speed detection value being a detected value of a revolution speed of the compressor and an inputted speed value, wherein the exhaust gas temperature control is a control changed from the speed control when the detected exhaust gas temperature exceeds a predetermined level, and the gas turbine fuel valve opening instruction value is generated based on the detected exhaust gas temperature, wherein the fifth motor torque instruction value candidate is generated to control a ratio of the gas turbine fuel valve opening instruction value to the motor torque instruction value such that the higher the detected exhaust gas temperature is, the larger the ratio is, when the detected exhaust gas temperature is in a predetermined temperature range, wherein the sixth motor torque instruction value candidate is generated to control the ratio of the gas turbine fuel valve opening instruction value to the motor torque instruction value such that the higher the detected exhaust gas temperature is, the larger the ratio is, when the detected exhaust gas temperature is in the predetermined temperature range, and is generated to control the ratio to be constant in a period where the detected exhaust gas temperature is in a predetermined temperature width when the detected exhaust gas temperature decreases after the ratio becomes a predetermined maximum value, wherein the seventh motor torque instruction value candidate is generated to control the ratio of the gas turbine fuel valve opening instruction value to the motor torque instruction value such that the higher the detected exhaust gas temperature is, the larger the ratio is, when the detected exhaust gas temperature is in the predetermined temperature range, generated to set an upper limit of the predetermined temperature range to an inputted maximum exhaust gas temperature, and generated such that a power of the electric motor becomes maximum when the detected exhaust gas temperature is the upper limit of the predetermined temperature range, wherein the eighth motor torque instruction value candidate is generated to control the ratio of the gas turbine fuel valve opening instruction value to the motor torque instruction value such that the higher the detected exhaust gas temperature is, the larger the ratio is, when the detected exhaust gas temperature is in the predetermined temperature range, and is generated such that the power of the electric motor becomes maximum when the detected exhaust gas temperature is the upper limit of the predetermined temperature range, wherein the upper limit of the predetermined temperature range is set to be a maximum exhaust gas temperature corresponding to a detected atmospheric air temperature referring to a correspondence relation between the atmospheric air temperature and a maximum temperature value set as the maximum exhaust gas temperature, and wherein the ninth motor torque instruction value candidate is generated by adding a predetermined value to the motor torque instruction value when a load of the driving unit decreases at a change rate larger than a predetermined level.

17. The control method according to claim 14, wherein in the generating, a temperature dependent instruction value is generated based on the detected exhaust gas temperature, and distributed into the motor torque instruction value and the gas turbine fuel valve opening instruction value, and a speed dependent instruction value is generated for a deviation between the speed detection value and the speed set value to become smaller, and distribute into the motor torque instruction value and the gas turbine fuel valve opening instruction value.

18. The control method according to claim 14, wherein in the generating, the motor torque instruction value is controlled to be increased when the speed control is changed to an exhaust gas temperature control in which the gas turbine fuel valve opening instruction value is generated based on the exhaust gas temperature, and the speed control is changed to the exhaust gas temperature control when the detected exhaust gas temperature exceeds a predetermined level.

19. The control method according to claim 14, wherein in the generating, the motor torque instruction value is generated to control a ratio of the motor torque instruction value to the gas turbine fuel valve opening instruction value such that the higher the detected exhaust gas temperature is, the larger the ratio is, when the detected exhaust gas temperature is in a predetermined temperature range.

20. The control method according to claim 19, wherein the ratio is controlled to be constant in a period where the detected exhaust gas temperature is in a predetermined temperature width when the detected exhaust gas temperature decreases after the ratio becomes a predetermined maximum value.

21. The control method according to claim 19, wherein in the generating, an upper limit of the predetermined temperature range is set to an inputted maximum exhaust gas temperature, and the motor torque instruction value is generated such that a power of the electric motor becomes maximum when the detected exhaust gas temperature is the upper limit of the predetermined temperature range.

22. The control method according to claim 19, wherein in the generating, the motor torque is generated such that a power of the electric motor becomes maximum when the detected exhaust gas temperature is at an upper limit of the predetermined temperature range, and the upper limit of the predetermined temperature range is set to be a maximum temperature value corresponding to a detected atmospheric air temperature in a correspondence relation.

* * * * *